United States Patent

Moeller

(10) Patent No.: US 8,148,933 B2
(45) Date of Patent: Apr. 3, 2012

(54) CIRCUIT ARRANGEMENT FOR LOAD-DEPENDENT CONTROL OF CURRENT FLOW TIME IN MOTOR WINDINGS OF SELF-TIMED BIPOLAR STEPPER MOTORS

(75) Inventor: Siegfried Moeller, Villingendorf (DE)

(73) Assignee: BDT AG, Rottweil (DE)

( * ) Notice: Subject to any disclaimer, the term of this patent is extended or adjusted under 35 U.S.C. 154(b) by 467 days.

(21) Appl. No.: 12/414,937

(22) Filed: Mar. 31, 2009

(65) Prior Publication Data
US 2010/0244763 A1 Sep. 30, 2010

(51) Int. Cl.
*G05B 19/40* (2006.01)
(52) U.S. Cl. ......... 318/685; 318/696; 318/671; 318/714
(58) Field of Classification Search ............. 318/685, 318/696, 671, 714, 494
See application file for complete search history.

(56) References Cited

U.S. PATENT DOCUMENTS

| | | | | |
|---|---|---|---|---|
| 4,761,598 A | * | 8/1988 | Lovrenich | 318/685 |
| 5,006,772 A | * | 4/1991 | Danby | 318/696 |
| 5,256,943 A | * | 10/1993 | German | 318/685 |
| 5,914,580 A | * | 6/1999 | Senoh | 318/696 |
| 5,959,426 A | * | 9/1999 | Moeller et al. | 318/685 |
| 6,271,641 B1 | * | 8/2001 | Yasohara et al. | 318/685 |

FOREIGN PATENT DOCUMENTS
DE 277570 4/1990
* cited by examiner

*Primary Examiner* — Walter Benson
*Assistant Examiner* — Thai Dinh
(74) *Attorney, Agent, or Firm* — Leydig, Voit & Mayer, Ltd.

(57) ABSTRACT

A circuit arrangement for automatic, load-dependent control of at least one winding current of a respective motor winding of a self-timed bipolar stepper motor, includes a first power driver circuit for a first motor winding and a second power driver circuit for a second motor winding. The circuit arrangement includes a first XOR gate and a second XOR gate, and a first resistor connected so as to couple the first XOR gate to an anode of a first diode. A cathode of the first diode is coupled to the comparator input of the first power driver circuit via a second resistor. A third resistor is connected so as to couple the second XOR gate to an anode of a second diode. A cathode of the second diode is coupled to the current-controlling comparator input of the second power driver circuit via a fourth resistor.

9 Claims, 3 Drawing Sheets

CIRCUIT ARRANGEMENT FOR LOAD-DEPENDENT CONTROL OF CURRENT FLOW TIME IN MOTOR WINDINGS OF SELF-TIMED BIPOLAR STEPPER MOTORS

FIELD

The present invention relates to a circuit arrangement for automatic, load-dependent control of the energization periods of the motor windings of self-timed bipolar stepper motors.

BACKGROUND

In stepper motors, it is common to select a speed profile for the motor, said speed profile being achieved by means of the sequence of the energization periods of the motor windings.

Stepper motor drives have the general problem that they accelerate and decelerate not only the actual load, but in addition also parasitic moments of inertia, so that the stepper motor produces a significantly higher torque than would be needed for the purely static load, and particularly so during the acceleration phase.

Furthermore, there are applications where the load torque can vary greatly in a temporally indefinite manner.

In such cases, it is advantageous for the current in the windings of the stepper motor to automatically adjust itself to the particular prevailing load conditions.

East German patent document DD 277 570 A1 describes a circuit arrangement for a self-timed stepper motor, said circuit arrangement controlling the current flow time and the current amplitude in the motor windings automatically depending on load.

To this end, the encoder signals controlling the motor, and the phase signals controlling the commutation of the windings, are used to derive a signal which is representative of the load phase angle between the actual position of the pole of the stepper motor and the controlling magnetic field and is used to control the current amplitude and the current flow time.

In the process, the current-controlling signal (Ua) switches to HIGH when an encoder signal changes, whereas when the phase change derived from the change of the encoder signal is output, said current-controlling signal switches back to LOW.

When a change of an encoder signal occurs, then the poles of the motor are already in a position where the next reversal of the winding energization could be triggered. If the stepper motor runs at a predetermined stepping rate and is not overloaded, then the change of the encoder signals occurs before the associated winding changes are output, so that the current-controlling signal (Ua) has a high phase. In this connection, East German patent document DD 277 570 A1 describes a circuit arrangement in which, during the high time of the current-controlling signal (Ua), the current supply is simultaneously interrupted in both motor windings, while, in parallel, an integration element (R4, C1) performs an integration over the duty factor of the current-controlling signal (Ua). If the duty factor increases, the output voltage of integration element (Uc) reduces the current amplitude in both motor windings simultaneously for the next motor steps.

This method has the disadvantage that there is only one current-controlling signal for both motor windings.

It is also a disadvantage that the current supply occurs in both motor windings simultaneously as a function of the high phase of the current-controlling signal, and also that the current amplitude is controlled using an integration element having a finite time constant. As a result, the control characteristics are relatively slow and the rotor may oscillate with respect to the rotating magnetic field.

Another disadvantage is that, in order to avoid oscillations, the integration time constant is preferably defined anew for each drive and each type of loading.

FIG. 1 illustrates the circuit arrangement according to DD 277 570 A1, which satisfies these requirements at least for low stepping frequencies, but which requires motor- and load-adapted dimensioning of the integration components, so as to prevent the rotor from oscillating with respect to the magnetic field.

FIG. 2 shows the signal patterns occurring in the circuit arrangement of FIG. 1.

It can be seen from row Ua in FIG. 2 that the signal (Ua) produced at the collector of transistor (Tr) switches to HIGH when a change of an encoder signal (ENCA; ENCB) occurs, and that signal (Ua) switches back to LOW when there is a change of the phase signals (PHA; PHB), which is associated with the encoder change.

In this connection, signal Ua switches to HIGH prior to a change of signals (PHA; PHB). During the interval in which current-controlling signal Ua is HIGH, the torque component of the winding in which the next reversal of the current direction will occur is small, and may already be negative.

Conversely, the motor winding which is not switched over after the HIGH time of Ua has elapsed produces a large torque component.

In the circuit of FIG. 1, the reduction in current supply occurs in both motor windings simultaneously, so that the maximum torque component in the motor winding in which the current direction is not reversed after signal Ua is not produced again until end of the current risetime.

SUMMARY

It is an aspect of the present invention to address the above-mentioned disadvantages, and, in particular, to reduce or eliminate the negative effect of the integration time constant.

Another, alternative, aspect of the present invention is to increase the available motor torque also in the part-load range by effecting the influence on the current flow time in only one motor winding, namely in the motor winding in which the next reversal of the current flow will occur.

In an embodiment, the present invention provides a circuit arrangement for automatic, load-dependent control of at least one winding current of a respective motor winding of a self-timed bipolar stepper motor, including a first power driver circuit for a first motor winding and a second power driver circuit for a second motor winding. The circuit further includes a first XOR gate and a second XOR gate. The circuit further includes a first resistor connected so as to couple the first XOR gate to an anode of a first diode, a cathode of the first diode being coupled to the comparator input of the first power driver circuit via a second resistor, and a third resistor connected so as to couple the second XOR gate to an anode of a second diode, a cathode of the second diode being coupled to the current-controlling comparator input of the second power driver circuit via a fourth resistor. A first current path defined by at least a first pull-up resistor, the first resistor, the first diode, and the second resistor is configured so that a logic high at the output of the first XOR gate sets the comparator input of the first power driver circuit at a level configured to prevent current from being supplied to the first motor winding through the first power driver circuit.

BRIEF DESCRIPTION OF THE DRAWINGS

The present invention will now be described in more detail with reference to an exemplary embodiment. In the illustrative drawings.

DETAILED DESCRIPTION

An embodiment of the present invention provides high driving torques for stepper motor drives during high-load conditions, and to automatically reduce the motor torque during lower load conditions by influencing the current flow time in the motor windings, the reduction being such that the currently required motor torque will actually be produced.

This is accomplished in that both the signal of the encoder associated with the stepper motor and the phase signal derived from this encoder signal for winding switching purposes are applied to the inputs of an XOR gate.

The XOR gate then outputs a signal whose high phase can be used to derive therefrom the instantaneous load on the stepper motor.

A separate current-controlling signal is produced for each encoder signal and the associated phase signal, respectively, and each current-controlling signal acts individually on the current flow time in the motor winding for the respective signal.

For a stepper motor which is intended for operation in a special fan system in a very wide frequency range of, for example, 0 Hz to 6000 Hz, which corresponds to 18000 rpm for a step angle of 18°, it is preferable to ensure that a sufficiently high winding current is provided to the motor during starting and during acceleration from a relatively low stepping frequency to a higher stepping frequency, or when the load torque increases, and that for relatively low stepping frequencies and relatively low load torques, the winding current is automatically reduced in such a way that the required motor torque is produced, that the rotor of the stepper motor is prevented from oscillating with respect to the controlling rotating field, and that the motor is prevented from overheating due to an excessive current load. Moreover, the winding current of the stepper motor is to be controlled automatically as a function of the load torque.

Figure 1:
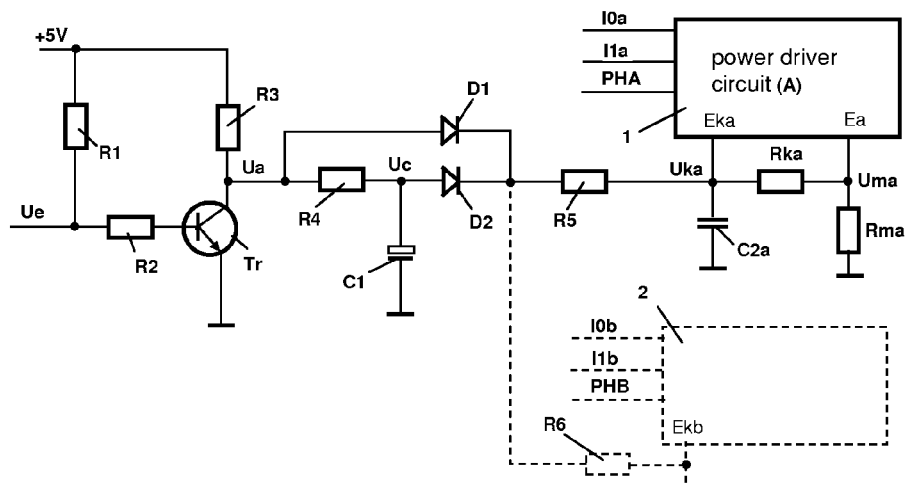
FIG. 1 shows the prior art circuit arrangement described in DD 277 570 A1.
Figure 2:
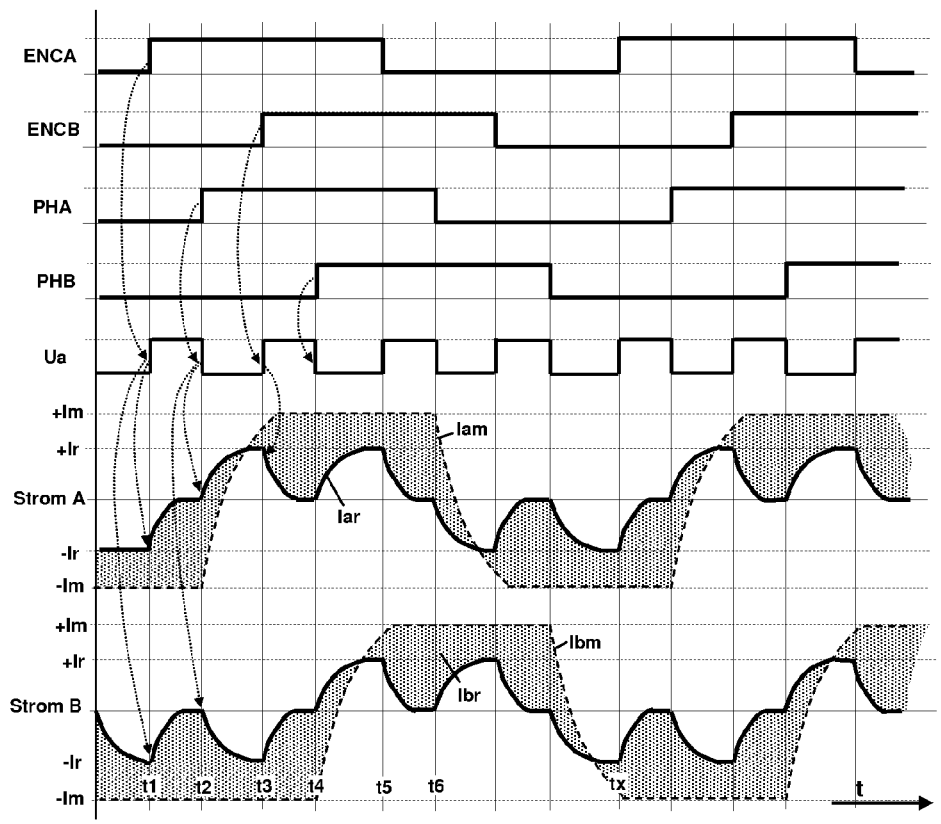
FIG. 2 illustrates the signal patterns according to the prior art.
Figure 3:
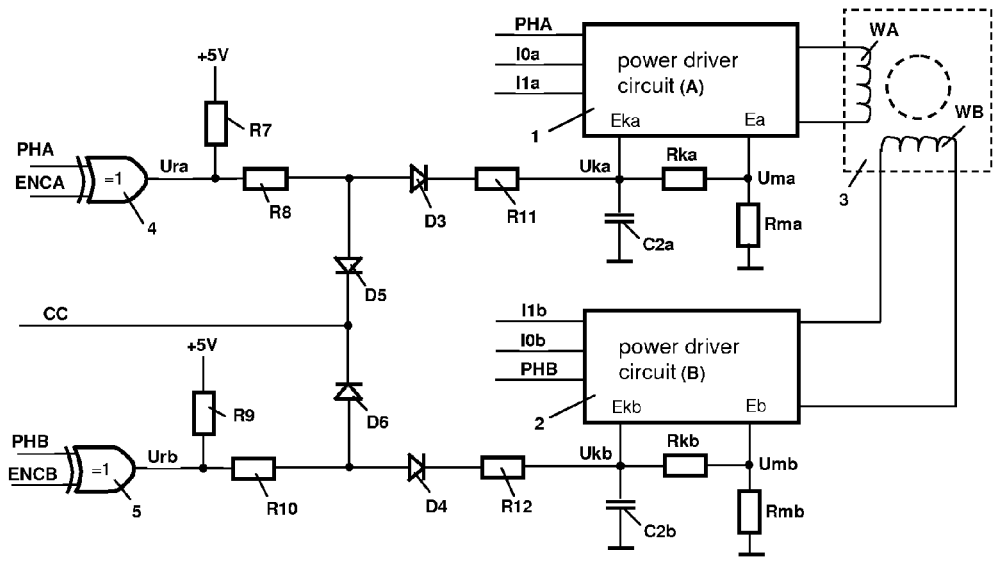
FIG. 3 shows a circuit arrangement according to an embodiment of the present invention.
Figure 4:
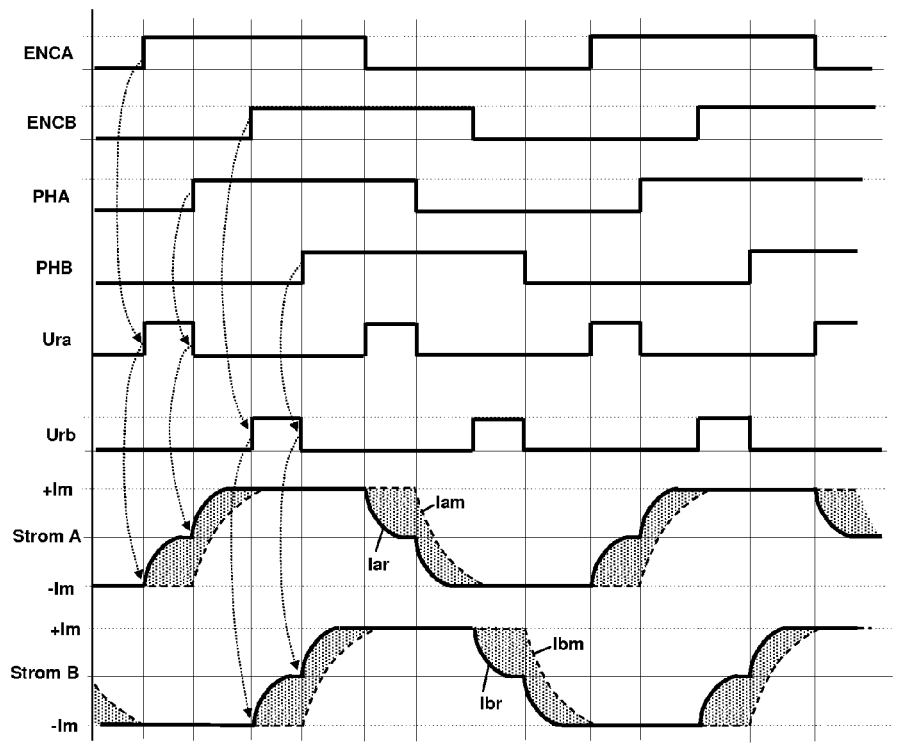
FIG. 4 illustrates the signal patterns occurring in the circuit arrangement of FIG. 3.

FIG. 3 shows a circuit arrangement according to an embodiment of the present invention, while FIG. 4 illustrates the signal patterns occurring in the circuit arrangement of FIG. 3. In order to reach high stepping frequencies of, for example, 3000 Hz to 6000 Hz, it is preferable to have short current risetimes and the shortest possible current-clearing times so as to enable the current in the motor windings to change direction very rapidly when the polarity of the current is reversed.

An embodiment according to the present invention, as illustrated in FIG. 3, produces a separate logic signal (Ura) for controlling the current flow time in motor winding (WA) and a separate logic signal (Urb) for controlling the current flow time in motor winding (WB).

Signal Ura is produced by applying encoder signal (ENCA) and phase signal (PHA), which is derived from encoder signal (ENCA), to the inputs of an XOR gate (4).

Signal Ura is then present at the output of XOR gate (4). Signal Ura switches to HIGH when signals ENCA and PHA have different levels, and switches to LOW when the two signals (ENCA, PHA) have the same logic level.

The high level at the output of XOR gate (4) is kept high by a pull-up resistor (R8).

The high level of Ura at the output of XOR gate (4) causes a current flow through resistor R8, diode D3, resistor R11, coupling resistor Rka, and sensing resistor Rma.

Resistor Rma is the sensing resistor through which the current of motor winding WA flows and which generates sensing voltage Uma.

Sensing voltage Uma is connected through coupling resistor Rka to comparator input Eka of power driver circuit A (1).

Coupling resistor Rka and capacitor C2a together form a low-pass filter, so that the peaks in the sensing voltage are filtered out.

Sensing resistor Rma has a very low resistance value, which is in the range from 0.1 ohm to about 3 ohm, depending on the maximum value set for the current amplitude.

On the other hand, the value of coupling resistor Rka is about 1 kOhm.

When signal Ura is HIGH, a current flows through coupling resistor Rka in the above-described manner and, thus, produces a voltage at comparator input Eka of power driver circuit A (1), the level of said voltage being higher than that of sensing voltage Uma.

Resistors R8 and R11 are dimensioned such that the current through Resistors R8 and R11 causes a current flow, so that there is a voltage drop across coupling resistor Rka, that voltage Uka at comparator input Eka is higher than the threshold voltage of the comparator even if the current through winding (WA) is zero milliampere. This is achieved by interrupting the current supply in motor winding WA while signal Ura is HIGH, without using other current-controlling input signals of power driver circuit A (1).

The control of the current supply to motor winding WB is performed in a manner equivalent to that for motor winding WA.

It can be seen from FIG. 4 that the current supply to motor windings WA, WB is not interrupted simultaneously but consecutively.

The rows Current A and Current B of FIG. 4 illustrate the current patterns in the respective motor windings. The thick lines show the actual patterns of currents (Iar, Ibr) in motor windings (WA, WB) caused by signals Ura and Urb, while the interrupted lines show the maximum current patterns occurring when signals Ura and Urb are inactive. The rows Current A and Current B of FIG. 4 show that the reduction of the current supply to the motor windings occurs before the current direction is reversed by signals PHA, PHB. As a result, the current in motor windings WA, WB has already decreased, and may even be zero, when the reversal of the current direction is caused by signals PHA, PHB. This reduces the current risetime, because the current no longer needs to change, for example, from +Imax to −Imax, but only from zero to Imax.

Figure 5:
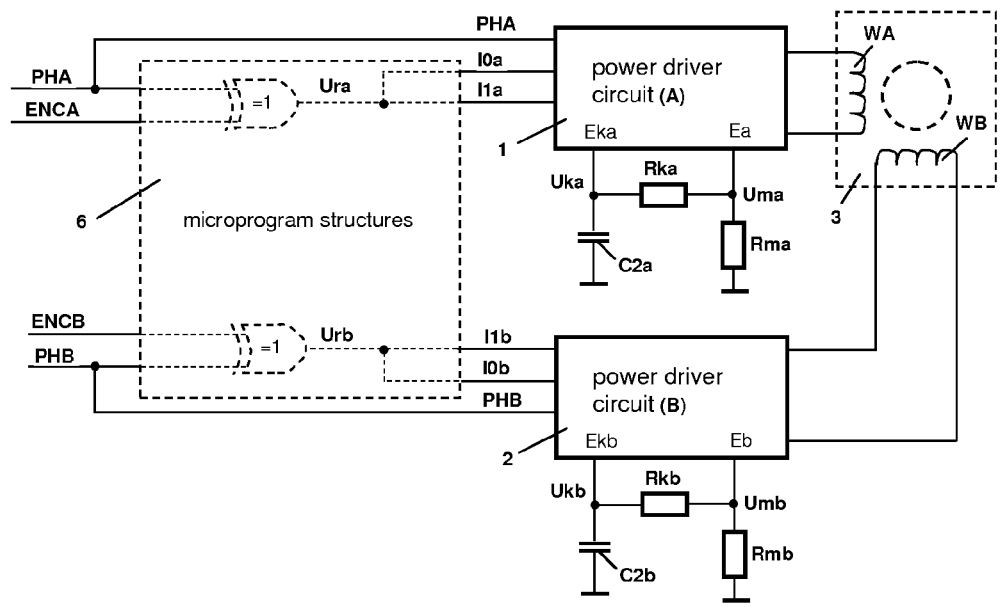
FIG. 5 shows a schematic of the control circuitry when using microprogram structures.

FIG. 5 shows a circuit arrangement according to an embodiment of the present invention implemented using microprogram structures.

The embodiment illustrated in FIG. 5 shows that in addition to controlling the levels of comparator inputs Eka, Ekb, it is also possible to perform control over current-controlling logic input signals (10a, 11a, 10b, 11b) of power driver circuits (1, 2)

Figure 6:
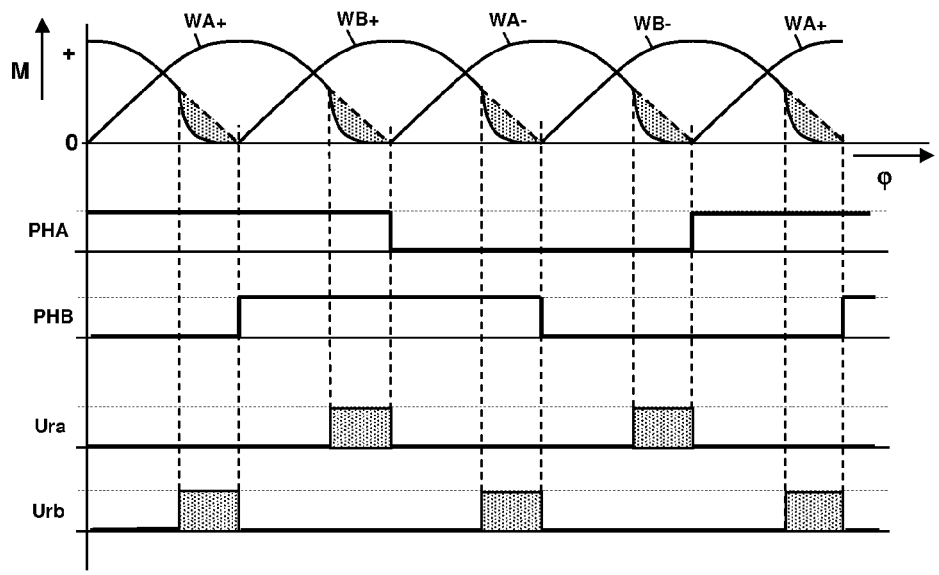
FIG. 6 illustrates the reduced current flow times.

It can be seen from FIG. 6 that the reduction of the current flow time occurs in the motor winding in which the reversal of the current direction is imminent.

FIG. 6 further shows that the torque component produced by the motor winding is which the current flow time is being reduced is small.

The second motor winding, in which no influence is exerted on the current flow time at this point, continues to produce the full motor torque.

There are operating conditions for the stepper motor, in which the maximum motor torque is preferably available.

This is true especially during acceleration and deceleration of the rotational motion from a relatively high speed to a lower speed, or during deceleration to a standstill.

While the control of the current flow times occurs automatically during acceleration and load changes, the deceleration of the motor is a special case.

During deceleration, the poles of the motor run ahead of the controlling rotating field, so that signals Ura and Urb have very long high phases. As a result, the current flow times in motor windings (WA, WB) are short, so that the motor will not produce any brake torque, or will produce only a very small brake torque.

Since the full motor torque should also be available for the braking operation, it is necessary to override the above-described automatic control of the current flow time during certain operating conditions, including braking.

The automatic control of the current flow times in the motor windings can also be accomplished using a low level of signal CC.

Signal CC is connected via diode D5 to the anode of diode D3 and to resistor R8 and at the same time also via diode D6 to the cathode of diode D4 and to resistor R10.

When signal CC is switched to LOW and signals Ura or Urb are HIGH, then the thus produced current does not flow toward comparator inputs (Eka, Ekb) of power driver circuits (1, 2), but via diodes D5 or D6 to the low level of signal CC.

In this manner, the high levels of signals Ura and Urb cannot affect the current flow times in motor windings WA and WB.

The circuit arrangement shown in FIG. 3 and FIG. 5 makes it possible that the stepper motor in a special fan system can be driven to a maximum stepping frequency of 6000 Hz, that the current flow time can be controlled to satisfy the particular prevailing load conditions of the motor, and that during low load conditions, the current flow time is reduced to such a degree that the motor is prevented from overheating.

The present invention is not limited to the embodiments described herein; reference should be had to the appended claims.

LIST OF REFERENCE NUMERALS AND ABBREVIATIONS

1 power output stage for a first motor winding of the stepper motor
2 second output stage for the second motor winding of the stepper motor
3 stepper motor having windings WA and WB
4 logic XOR gate for producing the signal Ura
5 logic XOR gate for producing the signal Urb
6 circuit complex including microprogram structures for producing the current-controlling signals 10a, 11a, 10b, 11b
+5V operating voltage, logic circuit
C1 electrolytic capacitor, integration element
C2a capacitor at comparator input Eka
C2b capacitor at comparator input Ekb
CC signal for enabling and disabling automatic control of the current flow times
D1 . . . D6 diodes
Ea current-carrying emitter output of power driver circuit (1)
Eb current-carrying emitter output of power driver circuit (2)
Eka comparator input of power driver circuit (1)
Ekb comparator input of power driver circuit (2)
ENCA encoder signal A, controls motor winding 1 of stepper motor (3)
ENCB encoder signal B, controls motor winding 2 of stepper motor (3)
10a, 11a logic inputs of the power driver circuit (1) for current control
10b, 11b logic inputs of the power driver circuit (2) for current control
Iar current through motor winding (a), reduced current level
Iam current through motor winding (a), maximum current level
Ibr current through motor winding (b), reduced current level
Ibm current through motor winding (b), maximum current level
+Im maximum positive current level
−Im maximum negative current level
+Ir reduced maximum positive current level
−Ir reduced maximum negative current level
M torque of stepper motor (3)
PHA logic input for controlling the current direction in winding WA of the stepper motor via power driver circuit (1)
PHB logic input for controlling the current direction in winding WB of the stepper motor via power driver circuit (2)
R1 pull-up resistor for input signal Ue
R2 series base resistor for transistor Tr
R3 collector resistor for transistor Tr
R4 resistor of integration element R1/C1
R5 interconnecting resistor to comparator input Eka of power driver circuit (1)
R6 interconnecting resistor to comparator input Ekb of power driver circuit (2)
R7 pull-up resistor for signal Ura of logic XOR gate (4)
R8 series resistor
R9 pull-up resistor for signal Urb of logic XOR gate (5)
R10 series resistor
R11, R12 series resistors
Rka coupling resistor between the potential at current-sensing resistor Rma and comparator input Eka of power driver circuit (1)
Rkb coupling resistor between the potential at current-sensing resistor Rmb and comparator input Ekb of power driver circuit (2)
Rma sensing resistor for measuring the current through winding WA of stepper motor (3)
Rmb sensing resistor for measuring the current through winding WB of stepper motor (3)
Current A current pattern in motor winding (A) of the stepper motor
Current B current pattern in motor winding (B) of the stepper motor
t time, general
t1-tx defined times in the control sequence
Tr transistor
Ua voltage at the collector of transistor (Tr)
Uc voltage at electrolytic capacitor (C1), integration voltage
Ue logic input voltage for controlling the lowering of the current
Uka voltage at comparator input (Eka)

Ukb voltage at comparator input (Ekb)

Uma voltage across sensing resistor (Rma), detects the current level in winding WA of stepper motor (3)

Umb voltage across sensing resistor (Rmb), detects the current level in winding WB of stepper motor (3)

Ura logic signal for controlling the reduction of the current in motor winding A Urb logic signal for controlling the reduction of the current in motor winding B WA motor winding A of stepper motor (3)

WA+ torque component produced by motor winding (WA) when the current direction is positive WA− torque component produced by motor winding (WA) when the current direction is negative WB motor winding B of stepper motor (3)

WB+ torque component produced by motor winding (WB) when the current direction is positive WB− torque component produced by motor winding (WB) when the current direction is negative

What is claimed is:

1. A circuit arrangement for automatic, load-dependent control of at least one winding current of a respective motor winding of a self-timed bipolar stepper motor, the circuit arrangement comprising:
a first power driver circuit for a first motor winding and a second power driver circuit for a second motor winding, each power driver circuit having a respective comparator input configured to control a predetermined current amplitude in the respective motor winding;
a first XOR gate having a first encoder signal and a first phase signal as inputs, the first phase signal being derived from first encoder signal and configured to control a current direction in the first motor winding;
a second XOR gate having a second encoder signal and a second phase signal as inputs, the second phase signal being derived from the second encoder signal and configured to control a current direction in the second motor winding;
a first resistor connected so as to couple an output of the first XOR gate to an anode of a first diode, a cathode of the first diode being coupled to the comparator input of the first power driver circuit via a second resistor; and
a third resistor connected so as to couple an output of the second XOR gate to an anode of a second diode, a cathode of the second diode being coupled to the current-controlling comparator input of the second power driver circuit via a fourth resistor,
wherein a first current path defined by at least a first pull-up resistor, the first resistor, the first diode, and the second resistor is configured so that a logic high at the output of the first XOR gate sets the comparator input of the first power driver circuit at a level configured to prevent current from being supplied to the first motor winding through the first power driver circuit.

2. The circuit arrangement as recited in claim 1, wherein a second current path defined by at least a second pull-up resistor, the third resistor, the second diode, and the fourth resistor is configured so that a logic high at the output of the second XOR gate sets the comparator input of the second power driver circuit at a level configured to prevent current from being supplied to the second motor winding through the second power driver circuit.

3. The circuit arrangement as recited in claim 2, further comprising a third diode and a fourth diode, an anode of the third diode being coupled to the anode of the first diode, an anode the fourth diode being coupled to the anode of the second diode, and a cathode of the third diode being coupled to a cathode of the fourth diode.

4. The circuit arrangement as recited in claim 1, further comprising a third diode and a fourth diode, an anode of the third diode being coupled to the anode of the first diode, an anode the fourth diode being coupled to the anode of the second diode, and a cathode of the third diode being coupled to a cathode of the fourth diode.

5. The circuit arrangement as recited in claim 4, wherein a logic signal is couplable to the cathodes of the third and fourth diodes so as to form a junction point, the logic signal preventing the respective output signal of the first and second XOR gates from affecting a respective current flow time in the first and second motor windings.

6. A circuit arrangement for automatic, load-dependent control of at least one winding current of a respective motor winding of a self-timed bipolar stepper motor, the circuit arrangement comprising:
a first power driver circuit for a first motor winding and a second power driver circuit for a second motor winding, the first power driver circuit having a first logic input configured to control a first current amplitude in the first motor winding, the second power driver circuit having a second logic input configured to control a second current amplitude in the second motor winding;
a first XOR gate having a first encoder signal and a first phase signal as inputs and an output coupled to the first logic input, the first phase signal being derived from the first encoder signal and configured to control a current direction in the first motor winding; and
a second XOR gate having a second encoder signal and a second phase signal as inputs and an output coupled to the second logic input, the second phase signal being derived from the second encoder signal and configured to control a current direction in the second motor winding.

7. The circuit arrangement as recited in claim 6, wherein a logic high at the output of the first XOR gate is configured to interrupt a current supply for the first motor winding via the first logic input, and a logic high at the output of the second XOR gate is configured to interrupt a current supply for the second motor winding via the second logic input.

8. The circuit arrangement as recited in claim 7, wherein the first and second XOR gates include respective microprogram structures.

9. The circuit arrangement as recited in claim 6, wherein the first and second XOR gates include respective microprogram structures.

* * * * *